United States Patent [19]
McMaster

[11] Patent Number: 4,911,024
[45] Date of Patent: Mar. 27, 1990

[54] FORCE SENSING

[75] Inventor: Mark McMaster, Burlington, Mass.

[73] Assignee: Barry Wright Corporation, Watertown, Mass.

[21] Appl. No.: 310,049

[22] Filed: Feb. 10, 1989

[51] Int. Cl.[4] .............................. G01L 5/16; G01L 1/22
[52] U.S. Cl. ................................. 73/862.04; 73/862.66
[58] Field of Search ............ 73/862.66, 862.65, 862.04, 73/862.67

[56] References Cited

U.S. PATENT DOCUMENTS

| | | | |
|---|---|---|---|
| 3,618,376 | 11/1971 | Shull et al. | 73/862.04 |
| 3,771,359 | 11/1973 | Shoberg. | |
| 3,949,603 | 4/1976 | Laimins | 73/862.66 |
| 4,094,192 | 6/1978 | Watson et al. | 73/862.04 |
| 4,488,441 | 12/1984 | Ramming. | |
| 4,493,220 | 1/1985 | Carignan et al. | |
| 4,550,617 | 11/1985 | Fraignier et al. | |
| 4,628,745 | 12/1986 | Hatamura. | |
| 4,640,139 | 2/1987 | Fritz. | |
| 4,671,118 | 6/1987 | Hatamura. | |
| 4,672,855 | 6/1987 | Schmieder. | |
| 4,674,339 | 6/1987 | Hatamura et al. | |
| 4,712,431 | 12/1987 | Hatamura. | |
| 4,748,844 | 6/1988 | Yoshikawa et al. | 73/862.04 |

FOREIGN PATENT DOCUMENTS 957980  2/1957  Fed. Rep. of Germany .

Primary Examiner—Charles A. Ruehl
Attorney, Agent, or Firm—Fish & Richardson

[57] ABSTRACT

A force/torque transducer including a first rigid member, a second rigid member, one or more flexural beams connected between the first rigid member and the second rigid member, the first and second members and the beam having a center point, the flexural beams having respective decoupling points that are symmetrical with respect to the center point, the flexural beams having symmetrical strain fields located on the flexural beams such that first and second strain fields achieve strain responses to a load of a single axis of magnitude equal to each other and third and fourth strain fields achieve strain responses to the load of the single axis of magnitude equal to each other, two of the responses being one sign and two being the other sign, the strain responses of the strain fields to loads of all other axes being capable of being cancelled out when the responses of one of the first and second fields and one of the third and fourth fields are given opposite sign and the responses of like axes are added together, strain gauges placed at the first, second, third and fourth strain fields, and a bridge circuit in which the strain gauges are electrically connected to be additive with respect to the load of the single axis and neutral with respect to loads of all other axes, the bridge circuit providing an output that indicates load of the single axis and is decoupled with respect to loads of all other axes.

19 Claims, 3 Drawing Sheets

FORCE SENSING

BACKGROUND OF THE INVENTION

The invention relates to six-axis force/torque transducers.

So-called six-axis force/torque transducers are used to measure the following six possible loads occurring at a single point: X axis force, Y axis force, Z axis force, X axis moment, Y axis moment, and Z axis moment, based on Cartsian coordinates. An application for these transducers is in robot wrists. An important aspect of any multi-axis force/torque transducer, especially one mounted in a robot wrist, is the ability to measure forces which are applied at a distance from the transducer. Any distance from the transducer to the point of force application creates a moment arm and can produce large torques on the transducer. Therefore, a force sensitive sensor must be able to measure small forces with high resolution, and at the same time withstand and measure large moments, without distorting the force measuring ability.

Multi-axis force/torque transducers typically have two rigid members through which the load to be measured is applied. Flexural beams are connected between the rigid members so as to deform (e.g., strain) in response to a load applied between the two rigid members. Deflection sensors (e.g., strain gauges) are mounted to sense deformations of the flexural beams and thus the load between the rigid members.

Two general approaches used in prior multi-axis force/torque transducers are single-stage transducers and multiple-stage transducers In a single-stage transducer, there are only two rigid members and a set of flexural beams between the two. On the flexural beams are a plurality of strain gauges that react to loads on more than one axis, though each in an independent, linear manner. The strain gauge outputs are transformed via matrices to obtain the loads on each axis. In a multiple-stage transducer, there are a plurality of stages that each employ a pair of rigid members and connecting flexural beams, each stage deflecting primarily under one axis of loading, with minimal deflection under loads from other axes. Strain gauges of each stage correspond to the load under which their stage deflects and are said to be "decoupled" with respect to loads on other axes.

SUMMARY OF THE INVENTION

In one aspect, the invention features in general a force/torque transducer that provides an output that indicates load on a single axis and is decoupled with respect to loads on all other axes. This is achieved by employing two rigid members (through which the load to be measured is applied) and one or more flexural beams that are connected between the two rigid members and have respective decoupling points that are symmetrical with respect to the center point (i.e., origin of load axes) of the transducer. Four strain gauges are placed at four selected strain fields on the flexural beams and electrically connected in a bridge circuit. The four strain fields are located so that there are two pairs of strain fields that each achieve equal strain responses to a load on the single axis of interest, two fields achieving responses of one sign, the other two achieving responses of the other sign. The fields are also selected so that the strain responses of the four strain fields to loads of all other axes are capable of being canceled out when the responses of two of the fields (one of each pair) are given opposite sign. The strain gauges are electrically connected so that the output of the bridge circuit is additive with respect to the load of the single axis and neutral with respect to loads of all other axes.

In preferred embodiments there are four flexural beams located at 90° positions from each other about the center point. Two of the strain gauges are mounted on a major surface of one the flexural beams, and the other two strain gauges are mounted on the corresponding major surface of the opposite flexural beam. Two strain gauges are connected in series between +V and −V excitation voltage terminals of the bridge circuit, a +S signal terminal being at the junction of the two, and the other two strain gauges are also connected in series between the +V and −V terminals, a −S signal terminal being at the junction of these two. This method can be extended trough the six possible load axes on a single-stage transducer.

In another aspect the invention features in general a flexural structure for a force/torque transducer that has higher sensitivity with respect to forces than to torques and relatively uniform stiffnesses and sensitivity for all three force axes. This is achieved by two rigid members and a plurality of flexural beams that are connected between the two rigid members and have a particular orientation and shape. The flexural beams have respective decoupling points that are symmetrical with respect to the center point of the transducer. Each flexural beam also has a length that is parallel to a plane bisecting the transducer, major surfaces that are tangential to the center point, and a minor lateral axis that is radial to the center point (E.g., FIGS. 1, 5b).

Other flexural beam orientations that can be employed include beams having lengths perpendicular to the plane bisecting the transducer (e.g., FIGS. 5a, 5d), beams having major surfaces radial to the center point (e.g., FIG. 5c), and beams having minor lateral axes tangential to a circle about the center point (e.g., FIG. 5d).

Other advantages and features of the invention will be apparent from the following description of embodiments thereof and from the claims.

DESCRIPTION OF THE PREFERRED EMBODIMENT

The preferred embodiment will now be described.

DRAWINGS

STRUCTURE AND OPERATION

Figure 1:
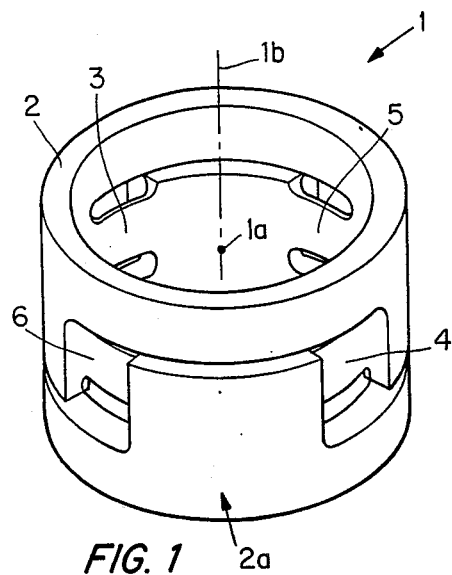
FIG. 1 is a perspective view of a multi-axis force/torque transducer according to the invention.
Figure 2:
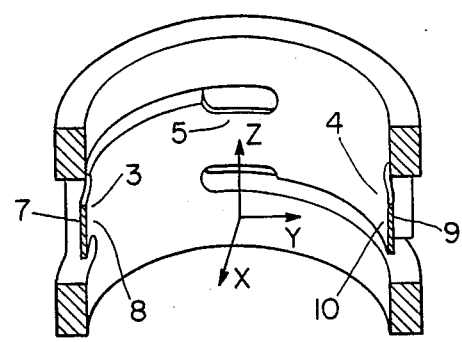
FIG. 2 is a perspective view, partially in section, of the FIG. 1 transducer.

Referring to FIGS. 1 and 2, there is shown preferred six-axis force/torque transducer 1 for measuring forces and torques between its upper rigid ring member 2 an lower rigid ring member 2a. Transducer 1 is in the general shape of a cylinder and has center point 1a along axis 1b of the cylinder between the top of ring member 2 and the bottom of ring member 2a. Transducer 1 also has a transverse plane through center point 1a and perpendicular to axis 1b.

Upper rigid member 2 is connected to lower rigid member 2a by four constant cross section flexural beams 3, 4, 5 and 6 which are on the transverse plane through center point 1a and 90 degrees apart. X, Y, Z axes are shown on FIG. 2. The Z axis is aligned with cylinder axis 1b. The X and Y axes pass through beams 5, 6 and 3, 4, respectively, and together define the transverse plane mentioned above. The beams are oriented such that their lengths are parallel to the transverse plane of the cylinder; their major surfaces are tangential to a circle about center point 1a, and their minor axes are radial to center point 1a. The beams are also oriented such that adjacent beams have their nearest ends attached to the same rigid member.

Flexural beams 3, 4, 5, 6 have respective decoupling points that are symmetrical with respect to center point 1a. The decoupling point of a beam is the point where an applied force acting through the beam will produce only a translation and no rotation of the end of the beam being acted on and the point which will rotate without translation when a moment is applied at the end of the beam.

Figure 2A:
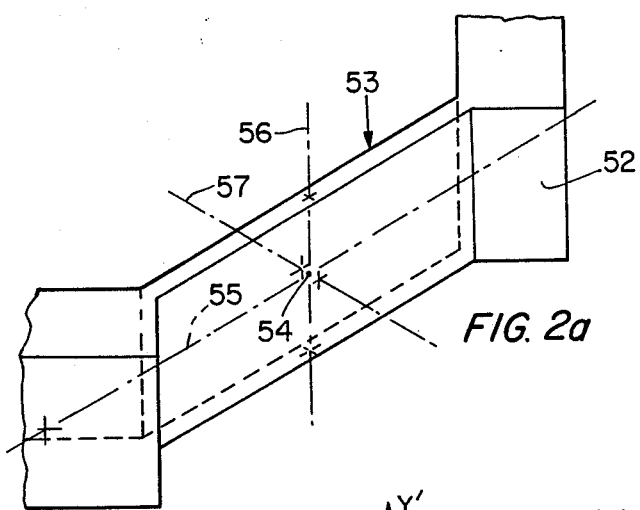
FIGS. 2a, 2b are diagrammatic perspective views of beam shapes that can be used in the FIG. 1 transducer.

FIG. 2a shows decoupling point 54 of straight beam 53, which point lies directly in the center of the beam. FIG. 2a also shows decoupling axes 55, 56, 57, which are parallel to the longitudinal, major lateral, and minor lateral axes of the beam and intersect at decoupling point 54. A force or moment applied exactly along one of these axes will result in a deflection only along the axis of applied load. An off-axis force or moment may produce a deflection whose line of action is off of the line of action of the load.

Figure 2B:
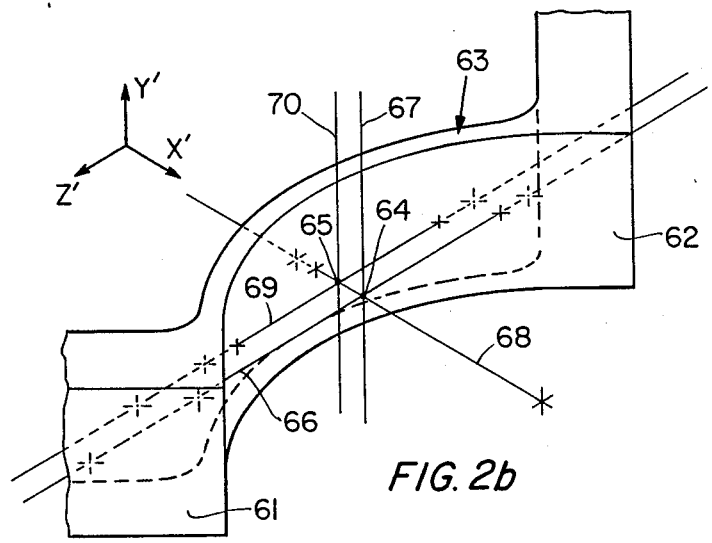

FIG. 2b shows that curved beam 63 (like curved beams 3, 4, 5, 6 used in the preferred embodiment of FIG. 1) has two decoupling points 64, 65 and two sets of decoupling axes 66, 67, 68 and 69, 70, 68. At point 64, a force applied to one rigid member parallel to the Z(longitudinal) axis 66 will result in no rotation at the end of the beam, and Y axis moment applied to one end of the beam will result in no translation at the decoupling point. Similarly, point 65 will decouple a Y parallel force and a Z parallel moment passing through the point. Both decoupling points lie on the axis of X force and X moment decoupling.

To create a structure with decoupled stiffnesses using similar straight beam elements, the beams should be placed so that their decoupling points are located symmetrically about each axis to be decoupled, with the decoupling axes of the beams in correspondingly symmetrical orientations. If the symmetrical arrangement is extended to three orthogonal axes, the structure will be fully decoupled. (Beams at similar location with respect to center must be symmetrical to one another but not necessarily to other beam in the structure.) A structure utilizing curved beam elements has the further restriction that the orientations of both beam decoupling points must each be oriented symmetrically about each axis to be decoupled, which is generally, but not necessarily, done by placing the axis through both decoupling points on a radius. A curved beam structure can also be decoupled in up to three axes, giving three independent translational and three independent rotational stiffnesses. Transducer 1 is such a curved beam structure.

The strain fields in an end loaded linearly elastic flexural beam will be composed of component fields corresponding to the components of loading (bending, shear, torsion, compression/tension), and these component fields will be proportional to the magnitudes of their corresponding loads, and will be linearly independent from one another. In a symmetrical elastically decoupled system constructed as described above, the forces or torques producing the strain fields will have components of symmetrical magnitudes of corresponding beam elements, although the sign, i.e., direction, of these magnitudes may be different. The strain fields produced by these forces or torques will also have symmetrical components of magnitude. For each axis of loading applied to the structure, there can be found pairs of points on the flexural beams where the components of strain produced have equal magnitude and direction, and pairs of points where the resultant strains are equal and opposite. Strain sensing gauges placed on these points measure total strain experienced at these points, which includes the components of interest. The beams need not be uniform along their length but should be symmetrical about planes defined by minor and major lateral axes and bisecting the lengths of the beams.

Beams 3, 4, 5, 6 preferably are slightly curved along their lengths (as n FIG. 2b), with the axis of curvature parallel to their major lateral axes, generally following the curve of the cylinder (although their radii of curvature are not necessarily the same as the cylinder's). Put another way, the major surfaces are tangential to a circle about center point 1a, and their minor axes are radial to center point 1a. The orientation and shape of beams 3, 4, 5, 6 desirably give transducer 1 very similar stiffness values along the three translational axes and also give high rotational stiffness about three axes.

Transducer 1 thus employs a symmetrical arrangement of similar flexural elements to decouple the stiffnesses of the structure. For a load applied along an axis of symmetry, oppositely positioned flexural elements will have components of deflection of equal magnitude, although the direction of deflection components may be different for each of the elements. Because the similar flexural elements experience similar deflections, there will be similarities in the strain fields induced through the elements Although no two elements will have identical strain fields for all axes of loading, oppositely positioned elements will have strain fields composed of identical magnitude components. This phenomenon is used to position a group of strain gauges and wire them into a strain gauge bridge circuit such that component strain values cancel for all axes of loading except a single axis of interest. This can be accomplished for all the axes of the transducer for which there is symmetry of flexural element properties and placement. For a transducer which is symmetrical on all three axes, there can be up to six decoupled, or independent, outputs (three forces and three moments). The preferred FIG. 1 embodiment and the alternative embodiments of the design shown in FIGS. 5a to 5d have this property.

FIGS. 2 and 3a–3f show the placement of strain gauges on the flexural beams, and FIGS. 4a–4d show wiring of the strain gauge bridges for the preferred embodiment. Outside face 7 and inside face 8 of beam 3 lie on the −Y axis of the transducer, and outside face 9 and inside face 10 of beam 4 lie on the +Y axis. Beams 5 and 6 have respective outside surfaces 11, 12 (FIGS. 3e, 3f), lying on the +X and −X axes respectively. FIGS. 3a-3f show the positioning of three sets of strain gauges: 71, 72, 73 and 74 are for sensing loads in the X force axis; gauges 81, 82, 83 and 84 are for sensing loads in the X moment axis; gauges 91, 92, 93 and 94 are for sensing loads in the Z moment axis, and gauges 101, 102, 103, 104 are for sensing loads in the Z force axis. FIGS. 4a-4d show the wiring of these strain gauges into four bridge circuits 70, 80, 90, and 100 for sensing loads in the X force axis, the X and Z moment axes, and the Z force axis, respectively. The gauges an bridges for sensing loads in the Y force axis and Y moment axis are similar to those used for the X axis measurements, though positions of gauges on transducer 1 are rotated 90°.

Addressing X force measurement first, gauge 71 is mounted longitudinally on the longitudinal and transverse center lines of surface 8 (which is intersected by the −Y axis), and reacts only to X axis forces (positive) and Z axis moments (negative polarity). Gauge 72 is mounted transversely on the longitudinal center line of surface 8 and has a negative polarity reaction to X forces, a positive polarity reaction to Y forces, and a positive polarity reaction to Z moments. Gauge 73 is i a similar position to gauge 72 on opposite inner beam surface 10, and has reactions of equal magnitude to gauge 72 with polarities of positive for X forces, positive for Y forces and positive for Z moments. Gauge 74 is mounted in a similar position to gauge 71 on surface 10 and has reaction of the same magnitudes, with polarities of negative for X forces and negative for Z moments. Wheatstone bridge circuit 70 (FIG. 4a) is connected so that gauges 71 and 73 keep the polarities of their signals, and gauges 72 and 74 change their polarities. The net result is that all but X axis force reactions are canceled out from the aggregate output signal $S_{XF}$.

Addressing X moment measurements next, gauge 81 is mounted at a 45° counter-clockwise from and to the side of the longitudinal center line of outer beam surface 7 and on the transverse center line and has a positive response to X forces, a negative response to Y and Z forces, a negative response to X moments, a positive response to Y moments, and a negative response to Z moments. Gauge 82 is mounted on the transverse center line and at 45° clockwise from and the same distance to the other side of the longitudinal center line as gauge 81. Its responses are the same magnitudes as those of gauge 81, but the polarities are positive for X and Z forces and X moments, and negative for Y forces and Y and Z moments. Gauge 83 is mounted on outer beam surface 9 of beam 4 in a similar position as gauge 81 except 45° clockwise. Its responses to loads are f the same magnitudes as gauges 81 and 82, except it has polarities of negative for X forces and X, Y, and Z moments, and positive for Y and Z forces. Finally, gauge 84 is mounted on surface 9 in a similar position as gauge 82 except that it is at 45° counter-clockwise. Its responses have the same magnitudes as gauges 81, 82 and 83, with polarities of negative for X and Z forces and Z moments, and positive for Y forces and X and Y moments. These four gauges are connected together in Wheatstone bridge circuit 80 (FIG. 4b) such that gauges 81 and 83 maintain their response polarities and gauges 82 and 84 reverse their response polarities. The net effect is for all response to cancel out except for the X moment responses, which all become negative and combine their magnitudes in aggregate output signal $S_{XM}$.

Turning now to Z moment measurements, gauge 91 is mounted longitudinally on the longitudinal center line, but far to the side of the transverse center line on outer surface 7 of beam 3; gauge 92 s mounted transversely on the longitudinal and transverse center lines of the same surface; gauge 93 is mounted in the same position as gauge 91 except it is on outer surface 9 of beam 4; and gauge 94 is mounted in the same position as gauge 92 except it is on the same surface as gauge 93. Their responses are as follows: Gauge 91 has positive responses for X and Y forces and Z moments; gauge 92 has negative responses for X and Y forces and Z moments; gauge 93 has responses of the same magnitudes as gauge 91, but has polarities of negative for X and Y forces and positive for Z moments; and gauge 94 has responses of the same magnitudes as gauge 92 but polarities of positive for X and Y forces and negative for Z moments. When connected together in Wheatstone bridge circuit 90, with gauges 91 and 93 in the positive polarity positions and gauges 92 and 94 in the negative polarity positions, all responses cancel out except those for Z moment responses, which combine in aggregate output signal $S_{ZM}$.

Figure 3A:
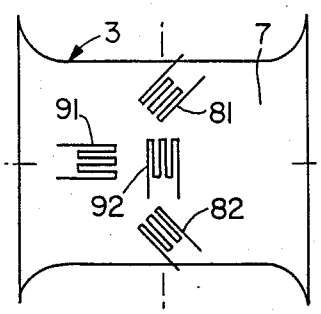
FIGS. 3a–3f are diagrams showing surfaces of flexural beams of, the FIG. 1 transducer.
Figure 3B:
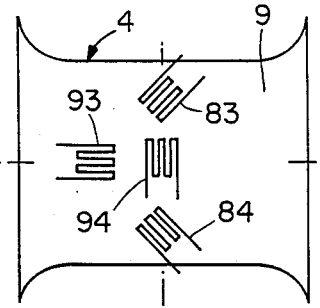
Figure 3C:
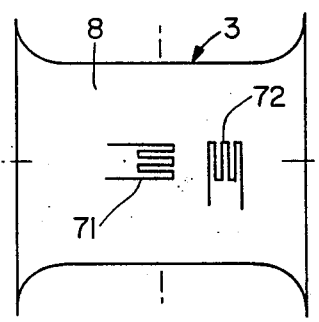
Figure 3D:
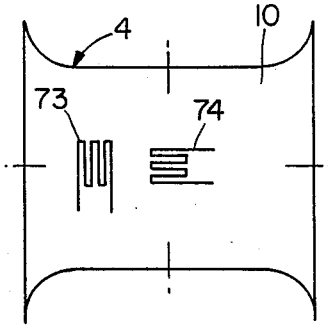
Figure 3E:
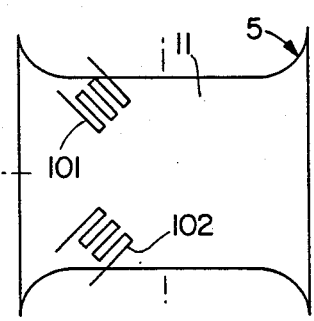
Figure 3F:
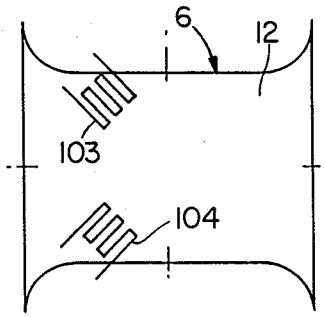
Figures 4A, 4B, 4C, 4D:
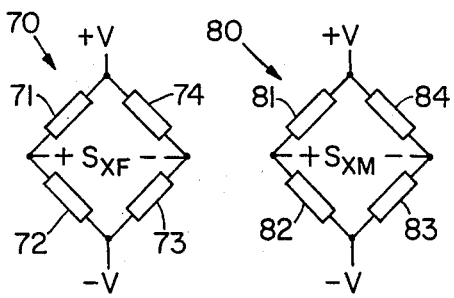
FIGS. 4a–4d are schematics of bridge circuits of the FIG. 1 transducer.

The gauges to measure the Z forces are mounted on outside surfaces 11, 12 of flexural beams 5 and 6 (FIGS. 3e, 3f). Gauge 101 is mounted on outside surface 11 of flexural beam 5 above and at 45° clockwise from the longitudinal center line and to the left of the transverse center line; its responses to X and Z forces and Z moments have a positive polarity, and its responses to Y forces and X and Y moments are negative. Gauge 102 is mounted on the same surface as gauge 101 but at 45° counter-clockwise from the longitudinal center line and at the same distance below the longitudinal center line as gauge 101 is above, and the same distance from the transverse center line as gauge 101; gauge 102 has responses of the same magnitude as gauge 101, but their polarities are positive for X forces and Y moments and negative for Y and Z forces and X and Z moments. Gauge 103 is mounted on outer surface 12 of flexural beam 6 at the same relative position and orientation as gauge 101 and has responses of the same magnitudes as those of gauges 101 and 102 except that their polarities are positive for Y and Z forces and Y moments and negative for X forces and X and Z moments. Gauge 104 is mounted on the same surface as gauge 103, but in the same relative position and orientation as gauge 102; the responses of gauge 104 have the same magnitudes as those of gauges 101, 102, 103; their polarities are positive for Y forces and X moments and negative for X and Z forces Y and Z moments. These four gauges are connected together in Wheatstone bridge circuit 100 such that gauges 101 and 103 maintain their response polarities, and gauges 102 and 104 reverse their response polarities. The net effect is for all responses to cancel out except for the Z force responses, which all become positive and combine in aggregate output signal $S_{ZF}$.

The gauges for the measurement of Y axis forces are located and interconnected in a bridge circuit in a similar fashion as those measuring X axis forces, except that they are mounted on the inside surfaces of flexural beams 5 and 6.

The gauges for the measurement of Y axis moments are located and interconnected in a bridge circuit in a similar fashion as those measuring X axis moments, except that they are mounted on the outside surfaces of flexural beams 5 and 6.

All axes of force and torque measurement are thus decoupled. The load measuring ranges of each axis can be individually adjusted, so that the transducer can measure large loads on some axes while measuring small loads on others. This is especially important when the actual point of application of the loads is at a distance from the transducer. A large moment arm will produce large torques for even small loads, so it is desirable to adjust the force sensing ranges independently from moment sensing ranges, so that small forces can be measured in conjunction with resulting large moments.

The primary use for transducer 1 is a wrist mounted force sensor for use on robots or other manipulators. However, the design may also be used wherever a multi-axis force sensor is required, such as automated machines, inspection stations, wind tunnels, medical monitors, inertial guidance systems, and various balancing machines.

In operation of transducer 1, bridge circuits 70, 80, 90, 100 and the two bridge circuits (not shown) for Y axis force and Y axis moment provide respective outputs that indicate the load of a single axis and are decoupled with respect to loads of all other axes.

Transducer 1 effectively has the combined advantages of both the multi-stage and single-stage approaches. It has the decoupled outputs with independently variable axis sensitivities of a multiple-stage transducer, and the small size, light weight, simple vibration patterns, and manufacturing ease of a single-stage design. Also, the FIG. 1 embodiment has been optimized for ability to withstand large moments and measure small forces simultaneously.

The preferred embodiment and tee embodiments shown in FIGS. 5a and 5b, which are described in more detail below, achieve their great strength to torques, while maintaining their sensitivities to forces, by the orientation of their flexural beams. A torque tends to act tangentially to the end of a moment arm through the center of torque action. The beams of the above mentioned embodiments have been placed such that their axes of greatest strength and stiffness (tension/compression along the length axis and shear along the major lateral axis) are tangential to the center of applied loads for maximized torque strength, and their axis of least stiffness (bending along the minor lateral axis) is radial to the center of applied loads to maximize force sensitivity.

An added advantage to the orientation of the beams described in the preceding paragraph is that when the transducer is subject to a lateral force applied some axial distance from the center of the transducer, producing a torque through the created moment arm, it can bear the additional stresses due to the torque without diminishing its capacity to bear the applied force. This feature is a result of the fact that the lateral axis force component of the load is carried principally by the beams which are stiffest to that force (the beams parallel to the force, which will lie on the axis perpendicular to it), and the torque component of the load is principally carried by the beams which are stiffest to that torque (the beams tangential to add with the greatest moment arm distance from the torque which will lie on the axis perpendicular to the torque axis). Because the torque produced by a lateral force applied at an axial distance from the center of the transducer is created on an axis perpendicular to the force axis, the separate force and torque components at the center will cause their greatest stresses in separate pairs of beams. The result is that neither component of the load substantially effects the amount of stresses, and therefore the load capacity, of the beams carrying the other component. In other designs where beams are oriented with their length axes radially, both the force and torque components are borne by the same set of beams. The combined beam stress due to both simultaneous components of load results in a proportional decrease in the load carrying capacity of both the force and torque axes, as compared to the load capacity of each axis of the transducer under single component loads.

Other Embodiments

Other embodiments of the invention are within the scope of the following claims.

For example, while the orientation of flexural beams 3, 4, 5, 6 and the rigid member mounting shown in FIG. 1 is preferred, particularly from the standpoint of having higher sensitivity with respect to forces than torques and uniform stiffness for forces, other orientations and rigid member mountings can be used, so long as the decoupling points are symmetrical with respect to the center point. For example, beams 3–6 can be straight (as in FIG. 2a) or may be curved along their major widths with axes of curvature parallel to their longitudinal axes). Other examples are shown in FIGS. 5a to 5d.

Figure 5A:
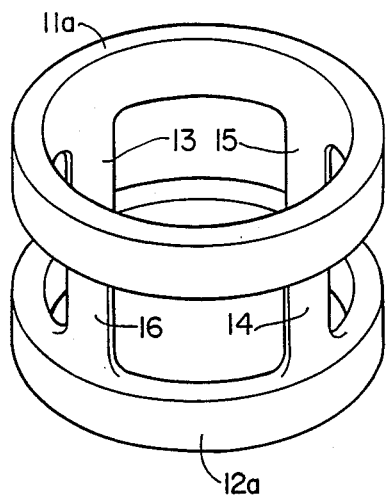
FIGS. 5a–5d are perspective views of alternative embodiments of multi-axis force/torque transducers according to the invention.

FIG. 5a shows a first alternative embodiment. In this configuration, the upper and lower rigid members 11a and 12a respectively are connected by four constant cross section beams 13, 14, 15 and 16, which are centered in the same locations as those of FIG. 1, but are oriented so that their longitudinal axes are parallel to the axis of the cylinder, and their major lateral axes are tangential to the cylinder. The beams in this embodiment may also be slightly curved along their lengths or widths. This embodiment has much more translational stiffness along the axis of the cylinder than it does radially (laterally). This embodiment also gives high rotational stiffness.

Figure 5B:
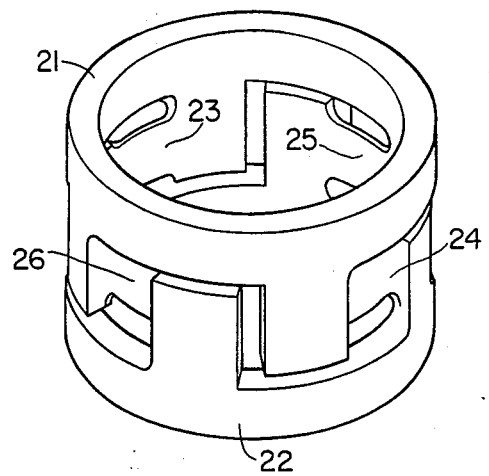

FIG. 5b shows a second alternative embodiment. It is the same as the preferred embodiment, except that beams 23, 24, 25 and 26 are aligned in the same direction (counterclockwise from upper rigid member 21 to lower rigid member 22 as viewed from above). The mechanical characteristics are similar as well.

Figure 5C:
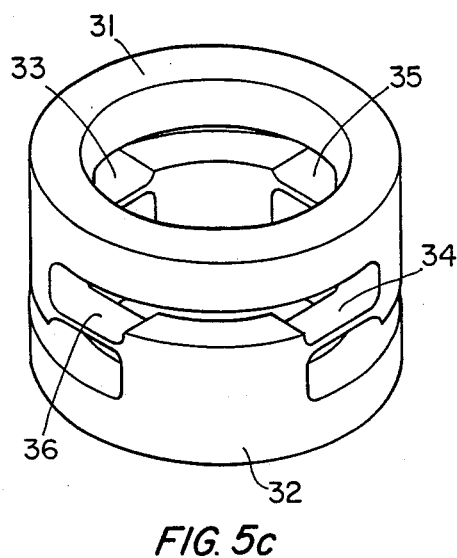

FIG. 5c shows a third alternative embodiment. This embodiment is similar to the preferred embodiment except that the major lateral axes of the beams 33, 34, 35 and 36 are radial to the cylinder of upper and lower rigid rings 31 and 32. Another difference is that the optional curvature of the beams should be along the length of the beams, and the axis of curvature should be parallel to the minor lateral axis (thickness) of the beams. This embodiment is very stiff along the radial translational and axial rotational axes of the cylinder and much less stiff along the axial translational and radial rotational axes.

Figure 5D:
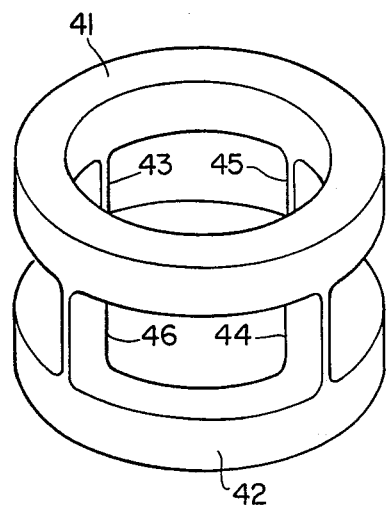

A fourth alternative embodiment is shown in FIG. 5d. This embodiment is similar to the first alternative embodiment except that the major lateral axes of the beams 43, 44, 45 and 46 are oriented radially to the cylinder of the structure of the upper and lower rigid members 41 and 42. Like the third alternative embodiment, the optional curvature of the beams should be along the length of the beams and should have an axis of curvature parallel to the minor lateral beam axis. This embodiment retains the translational and radial rotational stiffness of the first alternative embodiment, but has a much lower axial rotational stiffness.

Also, some of the flexural structures shown in the figures (e.g., FIGS. 1, 5b) could be used with other deflection sensors besides strain gauges.

Also, more or fewer than our flexural beams can be used. Ideally, the number of flexural beams is $2^N$, where N is 0, 1, 2, ... up to practical manufacturing limits (e.g., $2^{10}$). If only one flexural beam is employed, it will be a straight beam with its decoupling point at the center point of the transducer. Four is the minimum number to give full threedimensional strength and maintain symmetry on all axes.

Finally, for measurements of some axes (e.g., X axis force, Y axis force, and Z axis moment), it is possible to employ only two strain gauges at two fields and combine the responses in a bridge, using dummy resistors at the other two location, so that the output is additive with respect to load of the axis of interest and neutral with respect to loads of all other axes.

What is claimed is:

1. A plural load axis force and torque transducer for simultaneously measuring loads along at least one force load axis and at least one moment load axis, comprising
   a first rigid member,
   a second rigid member,
   one or more flexural beams connected between said first rigid member and said second rigid member,
   said first and second members and said beams having a center point,
   said flexural beams having, for each said load axis, respective decoupling points that are symmetrical with respect to the center point,
   each said flexural beam having a length, a major lateral axis and a minor lateral axis,
   said major and minor lateral axes being of different sizes,
   said flexural beams having, for each said load axis, symmetrical strain fields located on said flexural beams such that first and second strain fields achieve strain responses to a load of a single axis of magnitude equal to each other and third and fourth strain fields achieve strain responses to said load of said single axis of magnitude equal to each other,
   two of said responses being of one sign and two being of the other sign, said symmetrical strain fields also having responses to loads of at least three other axes,
   for each said load axis, the strain responses of said strain fields to loads of all other axes being capable of being cancelled out when the responses of one of said first and second fields and one of said third and fourth fields are given opposite sign and the responses are added together,
   strain gauges placed at said first, second, third and fourth strain fields for each said load axis, and
   a bridge circuit for each said axis in which said strain gauges are electrically connected to be additive with respect to the load of said single axis and neutral with respect to loads of all other axes, said bridge circuit providing an output that indicates load of said single axis and is decoupled with respect to loads of all other axes.

2. The transducer of claim 1 wherein there are $2^N$ said flexural beams, where N is 0, 1, 2 . . . .

3. The transducer of claim 2 wherein two of said strain gauges are mounted on a major surface of one said flexural beam, and the other two of said strain gauges are mounted on the corresponding major surface of the opposite said flexural beam.

4. The transducer of claim 3 wherein said two strain gauges are connected in series between $+V$ and $-V$ terminals of said bridge circuit, a $+S$ signal terminal being at the junction of the two, and said other two strain gauges are also connected in series between said $+V$ and $-V$ terminals, a $-S$ signal terminal being at the junction of the two.

5. The transducer of claim 2 wherein each said flexural beam has a length that is parallel to a plane through said center point, said plane being perpendicular to an axis extending from said first rigid member to said second rigid member.

6. The transducer of claim 5 wherein each said flexural beam has a minor lateral axis that is radial to the center point.

7. The transducer of claim 6 wherein each said flexural beam has major surfaces that are tangential to a circle about the center point in said plane.

8. The transducer of claim 6 wherein adjacent beams have their nearest ends attached to the same said rigid member.

9. The transducer of claim 5 wherein each said flexural beam has major surfaces that are radial to the center point and a minor lateral axis that is tangential to a circle about the center point in said plane.

10. The transducer of claim 2 wherein each said flexural beam has a length that is perpendicular to a plane through said center point, said plane being perpendicular to an axis extending from said first rigid member to said second rigid member.

11. The transducer of claim 10 wherein each said flexural beam has a minor lateral axis that is radial to a circle about the center point.

12. The transducer of claim 10 wherein each said flexural beam has a minor lateral axis that is tangential to a circle about the center point in said plane.

13. The transducer of claim 1 wherein there are six said outputs.

14. The transducer of claim 2 wherein said minor lateral axis is radial to the center point.

15. A force/torque transducer comprising
   a first rigid member,
   a second rigid member,
   one or more flexural beams connected between said first rigid member and said second rigid member,
   said first and second members and said beams having a center point,
   said flexural beams having respective decoupling points that are symmetrical with respect to the center point,
   said flexural beams having symmetrical strain fields located on said flexural beams such that first and second strain fields achieve strain responses to a load of a single axis of magnitude equal to each other and third and fourth strain fields achieve strain responses to said load of said single axis of magnitude equal to each other,
   two of said responses being of one sign and two being of the other sign,
   the strain responses of said strain fields to loads of all other axes being capable of being cancelled out when the responses of one of said first and second fields and one of said third and fourth fields are given opposite sign and the responses of like axes are added together, strain gauges placed at said first, second, third and fourth strain fields, and a bridge circuit in which said strain gauges are electrically connected to be additive with respect to the load of said single axis and neutral with respect to loads of all other axes, said bridge circuit providing an output that indicates load of said single axis and is decoupled with respect to loads of all other axes, wherein there are $2^N$ said flexural beams, where N is 0, 1, 2 . . . , wherein each said flexural beam has a length that is parallel to a plane through said center point, said plane being perpendicular to an axis extending from said first rigid member to said second rigid member, wherein each said flexural beam has a minor lateral axis that is radial to the center point, wherein adjacent beams have their nearest ends attached to opposite said rigid members.

16. The transducer of claim 2, 5, 6, 7, 8, 15, 9, 10, 11, or 12 wherein there are four said flexural beams located at 90° positions from each other about said center point.

17. A flexural structure for a force/torque transducer comprising a first rigid member, a second rigid member, at least three flexural beams connected between said first rigid member and said second rigid member, said first and second members and said beams having a center point, and strain gauges placed on said flexural beams, said flexural beams having respective decoupling points that are symmetrical with respect to the center point of said transducer, said flexural beams each having a length, two major surfaces, and a minor lateral axis, said length being parallel to a plane that passes through said center point and is perpendicular to an axis extending from said first rigid member to said second rigid member, said major surface being tangential to a circle about said center point in said plane, said minor lateral axis being radial to said center point, whereby said transducer has higher sensitivity with respect to forces than torques and has relatively uniform stiffness and sensitivity for all three force axes.

18. The transducer of claim 17 wherein adjacent beams have their nearest ends attached to the same said rigid member.

19. A flexural structure for a force/torque transducer comprising a first rigid member, a second rigid member, a plurality of flexural beams connected between said first rigid member and said second rigid member, said first and second members and said beams having a center point, and strain gauges placed on said flexural beams, said flexural beams having respective decoupling points that are symmetrical with respect to the center point of said transducer, said flexural beams each having a length, two major surfaces, and a minor lateral axis, said length being parallel to a plane that passes through said center point and is perpendicular to an axis extending from said first rigid member to said second rigid member, said major surface being tangential to a circle about said center point, said minor lateral axis being radial to said center point, whereby said transducer has higher sensitivity with respect to forces than torques and has relatively uniform stiffness and sensitivity for all three force axes, wherein adjacent beams have their nearest ends attached to opposite said rigid members.

* * * * *

UNITED STATES PATENT AND TRADEMARK OFFICE
CERTIFICATE OF CORRECTION

PATENT NO. : 4,911,024

DATED : March 27, 1990

INVENTOR(S) : Mark McMaster

It is certified that error appears in the above-identified patent and that said Letters Patent is hereby corrected as shown below:

Column 1, line 33  "multiple-stage transducers In a single" should read --multiple-stage transducers.  In a single--.

Column 2, line 9  "surface of one the flexural beams" should read --surface of one of the flexural beams--.

Column 2, line 19  "trough" should be --through--.

Column 2, line 34  "(E.g., Figs. 1, 5b)" should read --(e.g., Figs. 1, 5b)--.

Column 2, line 58  "beams of, the FIG. 1" should read --beams of the FIG. 1--.

Column 2, line 68  "ring member 2 an" should read --ring member 2 and--.

Column 4, line 29  "(as n FIG. 2b)," should read --(as in FIG. 2b)--.

Column 4, line 48  "the elements Although" should read --the elements. Although--.

Column 5, line 21  "The gauges an bridges" should read --The gauges and bridges--.

UNITED STATES PATENT AND TRADEMARK OFFICE
CERTIFICATE OF CORRECTION

PATENT NO. : 4,911,024

DATED : March 27, 1990

INVENTOR(S) : Mark McMaster

It is certified that error appears in the above-identified patent and that said Letters Patent is hereby corrected as shown below:

Column 5, line 25    "Gauge 73 is i a" should read --Gauge 73 is in a--.

Column 6, line 4    "gauge 92 s mounted" should read --gauge 92 is mounted--.

Column 7, line 33    "embodiment and tee" should read --embodiment and the--.

Column 7, line 61    "tangential to add with" should read --tangential to and with--.

Column 9, line 6    "fewer than our" should read --fewer than four--.

Column 9, line 12    "threedimensional strength" should read --three-dimensional strength--.

Column 9, line 18    "two location," should read --two locations--.

Signed and Sealed this

Eighth Day of September, 1992

Attest:

DOUGLAS B. COMER

*Attesting Officer*     *Acting Commissioner of Patents and Trademarks*